United States Patent [19]

Takasuga et al.

[11] 4,004,961
[45] Jan. 25, 1977

[54] STITCHING APPARATUS FOR STITCHING TIRE COMPONENTS ON A BUILDING DRUM

[75] Inventors: Yutaka Takasuga, Higashimurayama; Seiichiro Nishimura, Tokyo; Masayoshi Suzuki, Kodaira, all of Japan

[73] Assignee: Bridgestone Tire Company Limited, Kyoba, Japan

[22] Filed: Sept. 25, 1975

[21] Appl. No.: 616,888

[30] Foreign Application Priority Data

Sept. 26, 1974 Japan ............................ 49-111082

[52] U.S. Cl. ................................. 156/421; 91/405
[51] Int. Cl.² ........................................ B29H 17/08
[58] Field of Search .......... 156/408, 409, 410, 411, 156/412, 413, 421; 91/405, 410

[56] References Cited

UNITED STATES PATENTS

| | | | |
|---|---|---|---|
| 1,996,129 | 4/1935 | Thurman | 156/413 |
| 2,369,998 | 2/1945 | Bateman | 156/413 |
| 2,604,420 | 7/1952 | Barber | 156/409 |
| 2,740,460 | 4/1956 | Miller et al. | 156/413 |
| 3,272,083 | 9/1966 | Stoll | 91/405 |
| 3,535,188 | 10/1970 | Mallory et al. | 156/413 |
| 3,819,449 | 6/1974 | Caretta | 156/413 |

FOREIGN PATENTS OR APPLICATIONS

| | | | |
|---|---|---|---|
| 1,125,844 | 9/1968 | United Kingdom | 156/421 |
| 170,966 | 11/1921 | United Kingdom | 156/410 |

*Primary Examiner*—Charles E. Van Horn
*Assistant Examiner*—John E. Kittle

[57] ABSTRACT

A stitching apparatus for stitching tire components laid on a building drum, comprising a frame structure arranged opposingly to and spaced apart from the building drum, a central roller disposed opposingly to the mid-circumferential plane of the building drum and having a rotational axis parallel with the rotational axis of the building drum for stitching the mid-circumferential portions of the tire components on the building drum, at least a pair of side rollers circumferentially spaced apart from the central roller and arranged symmetrically to the mid-circumferential plane of the building drum for stitching both side portions of the tire components, each side roller having a rotational axis inclined to the rotational axis of the building drum and at least a surface portion made of an elastic material. The central and side rollers are alternatively projected and retracted toward and away from the circumferential surface of the building drum to stitch the tire components from their mid-circumferential portions to their both side portions.

7 Claims, 7 Drawing Figures

STITCHING APPARATUS FOR STITCHING TIRE COMPONENTS ON A BUILDING DRUM

The present invention relates to a stitching apparatus for stitching tire components such as carcasses, breakers and a tred laid on a building drum in a tire building machine, and more particularly to a stitching apparatus having a metal roller and a pair of pneumatic tire rollers to be urged against the tire components on the building drum.

Conventionally, there has been widely adopted such a stitching apparatus in which one or two pairs of rollers are rotatably carried on one or two travelling carriers and operated by an extremely complicated control system. The rollers are forced to axially move from the mid-circumferential portion to the shoulder portions of the building drum, while being held in pressing contact with the tire components on the building drum. Therefore, there has been widthwise stretch or waves in the tire components on the building drum, which lowers qualities such as tire uniformity. In order to overcome the above drawbacks, there has been proposed a multi-staged stitcher, as described in U.S. Pat. No. 3,819,449 to R. Caretta, dated June 25, 1974, which has a plurality of rollers multi-stagedly arranged but not movable along the rotational axis of the building drum. Even in the stitcher, it is impossible to obtain a finished tire having a uniform quality or performance by the following reasons. As the stitcher is provided with a pair of outside rollers each of which is in the form of truncated cone shape and has different diameter portions along its own rotational axis, there occur different circumferential speed portions along the contacting area between the peripheries of the roller and the tire components, and the tire components are thus squeezed by the rollers, with the result that the stretch and the waves are generated on the tire components, lowering the tire quality or performance. Even when urging pressure of each of the outside rollers against the tire components is held at a constant level, the urged pressure against the tire components are varied along the contacting area between the peripheries of the roller and the tire components, which makes it impossible to evacuate entrapped air from between the tire components and thus lowers the tire quality or performance. On the other hand, there are small gaps between the plurality of rollers in their axial direction, and thereby occur small urging pressure portions on the tire components between the rollers, which also lowers the tire quality or performance. In addition, it is required that other stitching rollers be replaced in an objectionable way depending upon the sizes of the tire components to be stitched.

It is an object of the present invention to provide a stitching apparatus which overcomes the afore-mentioned drawbacks inherent in the prior apparatus.

It is another object of the present invention to provide a stitching apparatus which enhances a tire quality or performance such as tire uniformity.

It is a further object of the present invention to provide a stitching apparatus which minimumizes the variation of urging pressure of the stitching rollers against the tire components as well as the difference between the circumferential speeds of the stitching rollers and the tire components to decrease the stretch and waves on the tire components.

It is a still further object of the present invention to provide a stitching apparatus which is provided with at least a pair of pneumatic tire rollers to be urged perpendicularly and uniformly against the side portions of the tire components.

It is a still further object of the present invention to provide a stitching apparatus which is provided with at least a metal roller for stitching the mid-circumferential portions of the tire components and at least a pair of pneumatic tire rollers which jointly urge substantially perpendicularly against the tire components to completely evacuate entrapped air from between the tire components.

It is a still further object of the present invention to provide a stitching apparatus which has a plurality of stitching rollers readily changeable depending upon the sizes of the tire components for increasing operational efficiency.

According to the present invention, the above-mentioned objects are attained by an apparatus which comprises: a frame structure arranged opposingly to and spaced apart from the building drum; a central roller disposed opposingly to the mid-circumferential plane of the building drum and having a rotational axis parallel with the rotational axis of the building drum for stitching the mid-circumferential portions of the tire components on the building drum; at least a pair of side rollers circumferentially spaced apart from the central roller and arranged symmetrically to the mid-circumferential plane of the building drum for stitching both side portions of the tire components, each side roller having a rotational axis inclined to the rotational axis of the building drum to urge perpendicularly against the tire components and having at least a surface portion made of an elastic material; a roller urging mechanism mounted on the frame structure and rotatably carrying thereon the central and side rollers for alternatively projecting and retracting the central and side rollers toward and away from the circumferential surface of the building drum to stitch the tire components from their mid-circumferential portions to their both side portions; and a roller urging pressure control mechanism for controlling the urging pressures of the side rollers exerted onto the both side portions of the tire components on the building drum in cooperation with the roller urging mechanism upon movement of the side rollers toward the building drum.

The above and other objects, features and advantages of the present invention will become clean from the following particular description of the invention and the appended claims, taken in conjunction with the accompanying drawings which show by way of example a preferred embodiment of the present invention.

Figure 6:
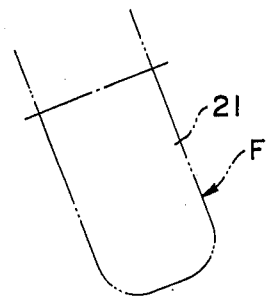
Figure 6:
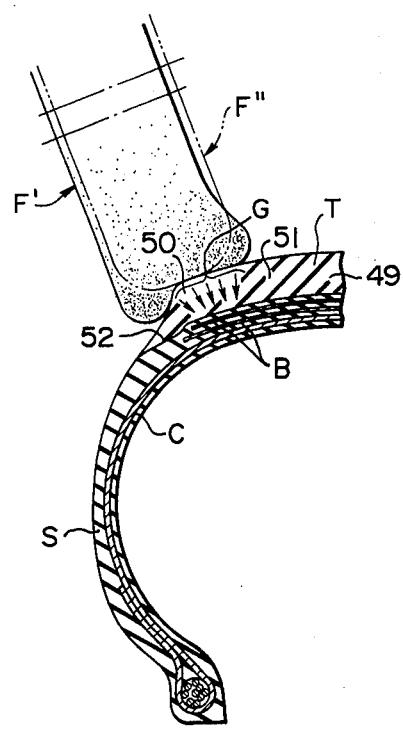
Figure 7:
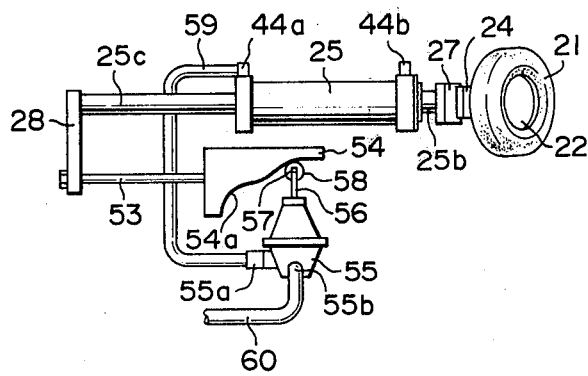

FIG. 6 is an explanatory view, fragmentarily cross-sectioned, of the tire components showing one of the third rollers which is moved from its initial position to its projected position where the third roller is urged against the tire components and is thereby deformed; and FIG. 7 is a side elevational view of another embodiment of the first shock absorbing assembly for controlling the third air-cylinder to adjust the movement of the third air-cylinder.

Figure 1:
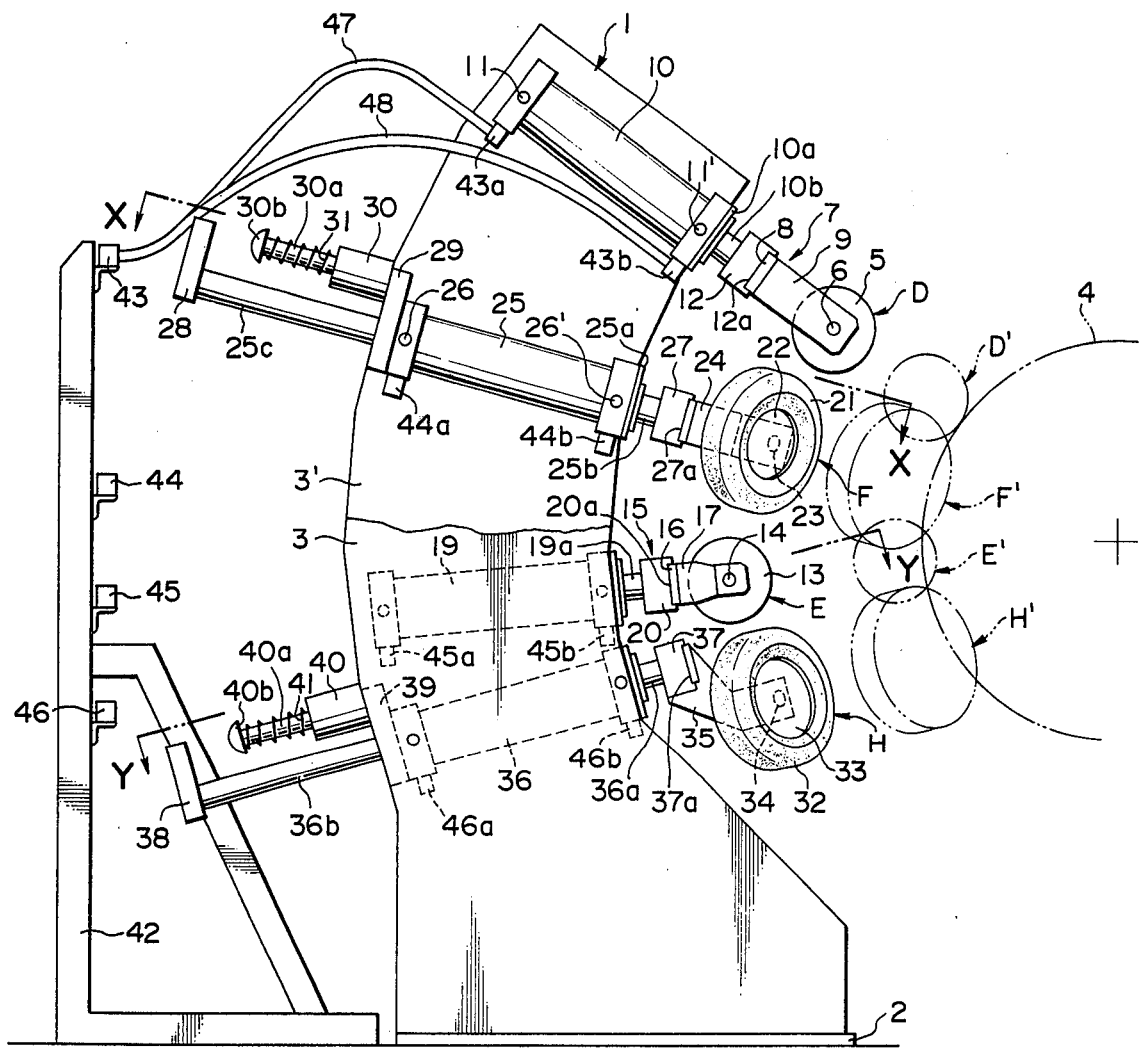
FIG. 1 is a side elevational view of a preferred embodiment of an apparatus for stitching the tire components on the tire building drum according to the present invention.
Figure 2:
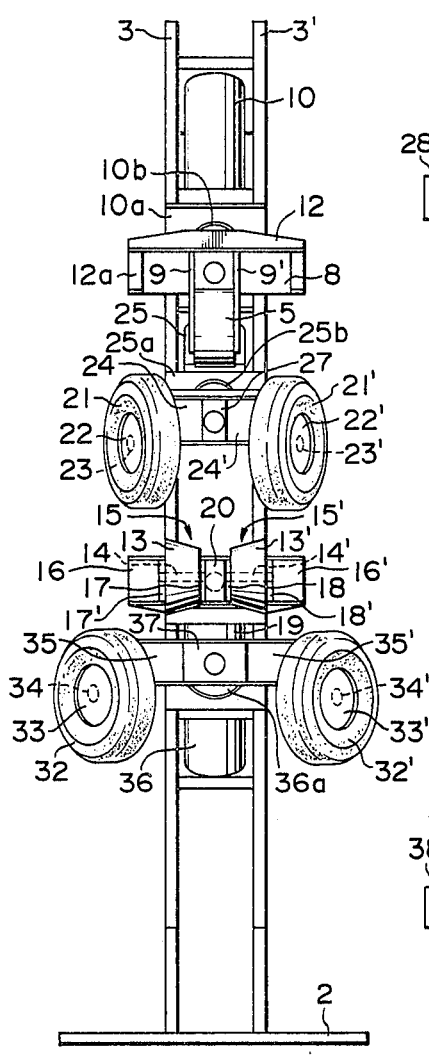
FIG. 2 is a front elevational view of the preferred embodiment of the apparatus illustrated in FIG. 1.

Referring now to the drawings and particularly in FIG. 1 and 2, a frame structure 1 comprises a base member 2 grounded on a floor, and a pair of parallel spaced support members 3 and 3' vertically mounted on the base member 2 in opposing relation with the mid-circumferential portion of a tire building drum 4. A first roller 5 which is constituted of a metal roller in the form of a generally cylindrical shape is rotatably mounted opposingly to the mid-circumferential plane of the building drum 4 on a first bracket 7 through a first roller shaft 6 parallel with the rotational axis of the building drum 4. The first bracket 7 includes a first bracket support 12 having its forward face a first groove 12a extending along the rotational axis of the building drum 4, a first slide base 8 slidably attached to the first groove 12a of the first bracket support 12, and a pair of first parallel support arms 9 and 9' perpendicularly attached to the first slide base 8 and rotatably supporting the first roller 5 through the first roller shaft 6 between the first support arms 9 and 9'. The slidable attachment of the first slide base 8 to the bracket support 12 enables the first slide base 8 and the first support arms 9 and 9' to be easily exchangeable and opposingly adjustable to the mid-circumferential plane of the building drum 4. A first air-cylinder 10 is supported by the support members 3 and 3' through a pair of pins 11 and 11' at its forward and rearward portion in radial relation with respect to the rotational axis of the building drum 4, while having at its forward end a flange 10a which is fixedly mounted on the forward end walls of the support members 3 and 3' opposing to the building drum 4. The first air-cylinder 10 has a piston rod 10b perpendicularly attached at its leading end to the first bracket support 12 of the first bracket 7 so as to cause the first roller 5 on the first support arms 9 and 9' to be movable toward and away from the surface of the building drum 4.

A pair of second rollers 13 and 13' each of which is constituted of a metal roller in the form of a generally truncated cone shape are circumferentially spaced apart from the first roller 5 and disposed at a position below the first roller 5. The second rollers 13 and 13' are arranged in side-by-side relation with each other with small diameter surfaces opposing to and axially spaced apart from each other, and are rotatably mounted on second brackets 15 and 15', respectively, through respective roller shafts 14 and 14' parallel with the rotational axis of the building drum 4. The second rollers 13 and 13' are required to be disposed axially outwardly of said first roller 5 in symmetrical relation with the mid-circumferential plane of the building arm 4. The second bracket 15 and 15' include a common second bracket support 20 having its forward face a second groove 20a extending along the rotational axis of the building drum 4. The second bracket 15 further includes a second slide base 16 slidably attached to the second groove 20a of the second bracket support 20, and a pair of parallel support arms 17 and 17' perpendicularly attached to the second slide base 16 and rotatably supporting the second roller 13 through the second roller shaft 14 between the second support arms 17 and 17'. On the other hand, the second bracket 15' further includes a second slide base 16' slidably attached to the second groove 20a of the second bracket support 20, and a pair of parallel support arms 18 and 18' perpendicularly attached to the second slide base 16' and rotatably supporting the second roller 13' through the second roller shaft 14' between the second support arms 18 and 18'. The slidably attachment of the second slide bases 16 and 16' to the bracket support 20 enables the second slide bases 16 and 16' and the second support arms 17, 17', 18 and 18' to be easily exchangeable as well as symmetrically adjustable to mid-circumferential plane of the building drum 4. A second air-cylinder 19 is substantially identical to the first air-cylinder 10 in construction and supported by the support members 3 and 3' in a similar fashion to that of the first air-cylinder 10 in radical relation with the building drum 4. The second air-cylinder 10 has a piston rod 19a perpendicularly attached at its leading end to the second bracket support 20 of the second brackets 15 and 15' so as to cause the second rollers 13 and 13' on the second support arms 17, 17', 18 and 18' to be movable toward and away from the surface of the building drum 4.

Figure 3:
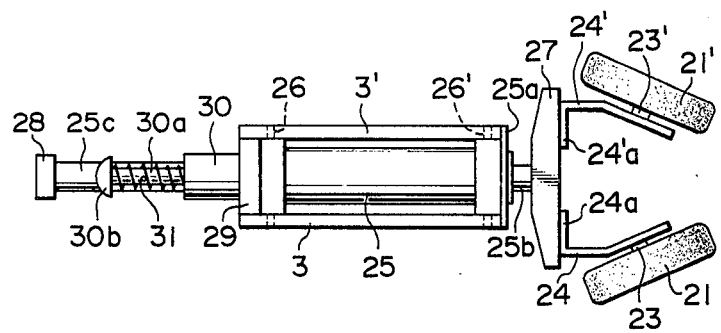
FIG. 3 is a plan view, partly in section, of the apparatus as seen from line X—X in FIG. 1 showing a third air-cylinder, a pair of third rollers and a first shock absorbing assembly.

In FIGS. 1 to 3, a pair of third rollers 21 and 21' each of which is constituted of a tire roller having therein a pneumatic tire tube (not shown) are assembled with wheels 22 and 22', respectively. The third rollers 21 and 21' are circumferentially spaced apart from the first and second rollers 5, 13 and 13' and located between the first roller 5 and the second rollers 13, 13', and are rotatably mounted on third support arms 24 and 24', respectively, through respective roller shafts 23 and 23'. The roller shafts 23 and 23' are adapted to be inclined through predetermined angles with respect to the rotational axis of the building drum 4 to perpendicularly urge the tire components on the building drum 4. The third rollers 21 and 21' are disposed axially outwardly of the second rollers 13 and 13' in symmetrical relation with the mid-circumferential plane of the building drum 4. The third support arms 24 and 24' are each in the form of a L-shape somewhat curved inwardly at its forward end portion and have the respective roller shafts 23 and 23' which rotatably support the wheels 22 and 22', respectively. A third air-cylinder 25 is constituted of a double rods type air-cylinder having a cylinder, a piston reciprocably movable in the cylinder, and a pair of coaxial piston rods connected perpendicularly to the both surfaces of the piston and extending throughout the cylinder. The air-cylinder 25 is supported by the support member 3 and 3' through a pair of pins 26 and 26' at its forward and rearward portions in radical relation with respect to the rotational axis of the building drum 4, while having at its forward end a flange 25a which is fixedly mounted on the forward end walls of the support members 3 and 3' opposing to the building drum 4. To the leading end of a piston rod 25b of the third air-cylinder 25 at the side of the building drum 4 is perpendicularly attached a third bracket support 27 which has its forward face a third groove 27a engaged with the bottom portions 24a and 24a' of the third support arms 24 and 24' for allowing the support arms 24 and 24' to be easily exchangeable and symmetrically adjustable to mid-circumferential plane of the building drum 4. The third support arms 24 and 24' are spaced apart from and opposing to each other, and attached to the third bracket support 27 in symmetrical relation with the mid-circumferential plane of the building drum 4 with their axial lines of the roller shafts 23 and 23' intersecting at a position between the forward face of the third bracket support 27 and the third roller shafts 23 and 23'. The third bracket support 27 and the third support arms 24 and 24' constitute as a whole a third bracket. To the rear end of the piston rod 25c rearwardly of the third air-cylinder 25 is perpendicularly attached a plate member 28, and to the rear end of the third air-cylinder 25 is attached a bracket 29 carrying thereon a shock absorber 30. A control rod 30a is provided in the shock absorber 30, extending toward the plate member 28 to decrease the projecting speed of the piston rod 25b toward the building drum 4. A spring stop head 30b is formed at the top of the control rod 30a, and a compression spring 31 is provided between the spring stop head 30b and the shock absorber 30 so as to restore the control rod 30a to its extended initial position.

Figure 4:
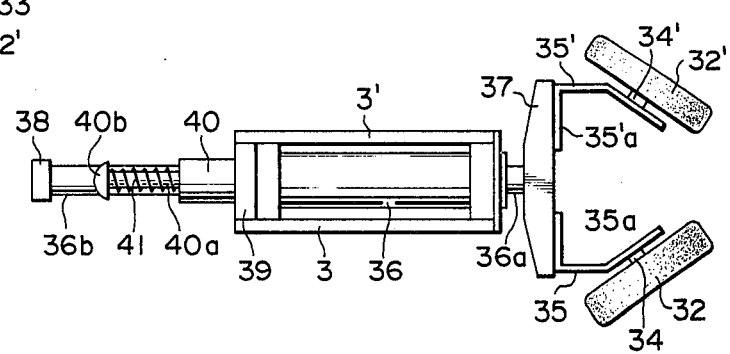
FIG. 4 is a plan view, partly in section, of the apparatus as seen from line Y—Y in FIG. 1 showing a fourth air-cylinder, a pair of fourth rollers and a second shock absorbing assembly.

In FIGS. 1, 2 and 4, a pair of fourth rollers 32 and 32' each of which is constituted of a tire roller having therein a pneumatic tire tube (not shown) are assembled with wheels 33 and 33', respectively. The fourth rollers 32 and 32' are circumferentially spaced apart from the first, second and third rollers 5, 13, 13', 21 and 21' and located at a position below the second rollers 13 and 13', and rotatably mounted on fourth support arms 35 and 35', respectively, through respective roller shafts 34 and 34'. The roller shafts 34 and 34' are adapted to be inclined through predetermined angles with respect to the rotational axis of the building drum 4 to perpendicularly urge the tire components on the building drum 4. The fourth rollers 32 and 32' are disposed axially outwardly of the third rollers 21 and 21' in symmetrical relation with the mid-circumferential plane of the building drum 4. The fourth support arms 35 and 35' are each in the form of a L-shape somewhat curved inwardly at its forward end portion and have the respective roller shafts 34 and 34' which rotatably support wheels 33 and 33', respectively. A fourth air-cylinder 36 is substantially identical to the third air-cylinder 25 in construction and supported by the support members 3 and 3' in a similar fashion to that of the third air-cylinder 25 in radical relation with the rotational axis of the building drum 4. To the leaning end of a piston rod 36a at the side of the building drum 4 is perpendicularly attached a fourth bracket support 37 which has its forward face a fourth groove 37a engaged with the bottom portions 35a and 35a' of the fourth support arms 35 and 35' for allowing the support arms 35 and 35' to be easily exchangeable and symmetrically adjustable to the mid-circumferential plane of the building drum 4. The fourth support arms 35 and 35' are spaced apart from and opposing to each other, and attached to the fourth bracket supports 37 in symmetrical relation with the mid-circumferential plane of the building drum 4 with their axial lines of the fourth roller shafts 34 and 34' intersecting at a position between the forward face of the fourth bracket support 37 and the fourth roller shafts 34 and 34'. The fourth bracket support 37 and the fourth support arms 35 and 35' constitute as a whole a fourth bracket. The distance from the intersecting point of the axial lines of the fourth roller shafts 34 and 34' to the forward end of the fourth air-cylinder 36 is shorter than the distance from the intersecting point of the axial lines of the third roller shafts 23 and 23' to the forward end of the third air-cylinder 25. To the rear end of the piston rob 36b rearwardly to the fourth air-cylinder 36 is perpendicularly attached a plate member 38, and to the rear end of the fourth air-cylinder 36 is attached a bracket 39 carrying thereon a shock absorber 40. A control rod 40a is provided in the shock absorber 40, extending toward the plate member 38 to decrease the projecting speed of the piston rod 36b toward the building drum 4. A spring stop head 40b is formed at the top of the control rod 40a, and a compression spring 41 is provided between the stop head 40b and the shock absorber 40 so as to restore the control rod 40a to its extended initial position.

An additional frame structure 42 is provided backwardly of the frame structure 1 to support air-junctions 43, 44, 45 and 46 for introducing compressed air to and discharging from the first, third, second and fourth air-cylinders 10, 25, 19 and 36. The first air-cylinder 10 has at its rear and fore ends ports 43a and 43b, respectively, which are connected to the air-junction 43 through air-hoses 47 and 48, respectively. The second air-cylinder 19 also has at its rear and fore ends ports 45a and 45b, respectively, which are connected to the air-junction 45 through air-hoses (not shown) in a similar manner. The third air-cylinder 25 also has at its rear and fore ends ports 44a and 44b, respectively, which are connected to the air-junction 44 through air-hoses (not shown) in a similar manner. The fourth air-cylinder 36 also has at its rear and fore ends ports 46a and 46b, respectively, which are connected to the air-junction 46 through air-hoses (not shown) in a similar manner. The air-junction 43 accommodates therein a change-over valve which serves to introduce compressed air into the port 43a through the air-hose 47 and to discharge it out of the port 43b through the air-hose 48 or vice versa, causing the piston rod 10b of the first air-cylinder 10 to be movable toward and away from the building drum 4. Similarly, the air-junction 44 accommodates therein a change-over valve which serves to introduce compressed air into the port 44a through the air-hose and to discharge it out of the port 44b through the air-hose or vice versa, causing the piston rods 25b and 25c of the third air-cylinder 25 to be movable toward and away from the building drum 4. Likewise, the air-junction 45 accommodates therein a change-over valve which serves to introduce compressed air into the port 45a through the air-hose and to discharge it out of the port 45b through the air-hose or vice versa, causing the piston rod 19a of the second air-cylinder 19 to be movable toward and away from the building drum 4. The air-junction 46 also accommodates therein a change-over valve which serves to introduce compressed air into the port 46a through the air-hose and to discharge it out of the port 46b through the air-hose or vice versa, causing the piston rods 36a and 36b of the fourth air-cylinder 36 to be movable toward and away from the building drum 4. The discharged compressed air from the ports 43a, 43b, 44a, 44b, 45a, 45b, 46a and 46b into the air-junctions 43, 44, 45 is thereafter discharged into the atmosphere.

The operation to stitch the tire components such as for example a tire tread having breakers on the inner periphery thereof and tire carcasses shaped toroidally on the building drum 4 in the apparatus thus constructed and arranged will now be described hereinafter.

When the apparatus embodying the present invention is held at rest, the first, second, third, fourth air-cylinders 10, 19, 25 and 36 is maintained in the conditions having the piston rods 10b, 19a, 25b, 25c, 36a and 36b kept backwardly retracted so that the first, second, third and fourth rollers 5, 13, 21, 21', 32 and 32' are held in the positions remotest from the building drum 4.

Figure 5:
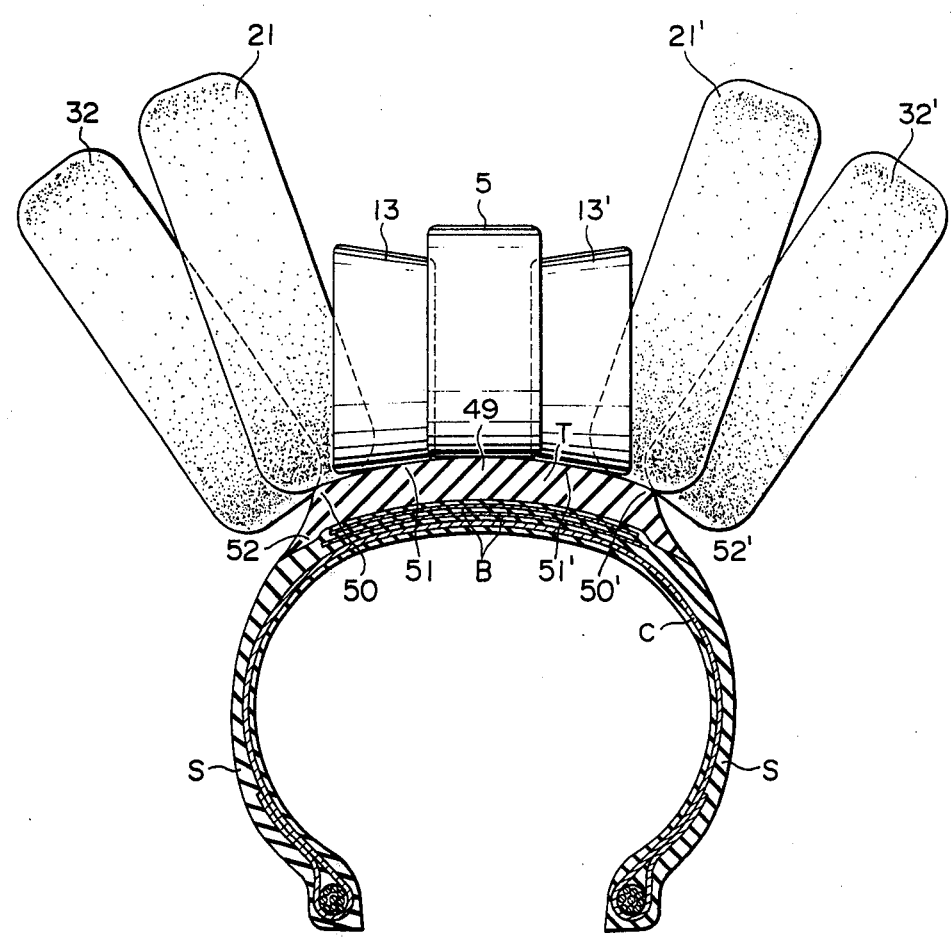
FIG. 5 is a cross-sectional explanatory view of the tire components which are held in contact with first, second, third and fourth rollers.

Before starting the apparatus thus conditioned, the tread T which is assembled at its inner periphery with breakers B is adhered to the carcasses C having at the outer side peripheries thereof a pair of side rubber strips S. The compressed air is then introduced into the port 43a from the air-junction 43 through the air-hose 47 and is discharged into the air-junction 43 from the port 43b through the air-hose 48 so that the piston rod 10b of the first air-cylinder 10 is caused to project forwardly. The first roller 5 is thus moved from a retracted initial position D as shown in full line to a projected position D' as shown in phantom lines in FIG. 1 to be brought into contact with the mid-circumferential portion 49 as shown in FIG. 5 of the tread T on the toroidally shaped carcasses C on the building drum 4 which is under rotation so that the first roller 5 is rotated around the first roller shaft 6 to stitch the mid-circumferential portion 49 of the tread T on the carcasses C. After a predetermined time passes from the time when the air-cylinder 10 is actuated to forwardly project the roller 5, the compressed air is introduced into the port 45a from the air-junction 45 and discharged into the air-junction 45 from the port 45b so that the piston rod 19a of the second air-cylinder 19 is caused to project forwardly. The second rollers 13 and 13' are thus moved from a retracted initial position E as shown in full line to a projected position E' in phantom lines as shown in FIG. 1 to be brought into contact with the intermediate portions 51 and 51' interposed between the mid-circumferential portion 49 and the shoulder portions 50 and 50' of the tread T so that the second rollers 13 and 13' are rotated around the respective roller shafts 14 and 14' to stitch the intermediate portions 51 and 51' of the tread T. At this time, the first roller 5 is held in contact with and stitching the central portion 49 of the tread T. When the stitching operations are carried out on the mid-circumferential portion 49 and the intermediate portions 50 and 50' by means of the first roller 5 and the second rollers 13 and 13', respectively, for a predetermined time, the change-over valve in the air-junction 43 is changed to introduce the compressed air into the port 43b from the air-junction 43 through the hose 47 and to discharge it into the air-junction 43 from the port 43a through the hose 48 so that the piston rod 10b of the first air-cylinder 10 is retracted to move the first roller 10 from the projected position D' to the initial retracted position D. While the stitching operation is being carried out on the intermediate portions 51 and 51' of the tread T by the second rollers 13 and 13', the third rollers 21 and 21' commence to be projected toward the building drum 4. After a predetermined time passes from the time when the second air-cylinder 19 is actuated to forwardly project the second rollers 13 and 13', the compressed air is introduced into the port 44a from the air-junction 44 and discharged into the air-junction 44 from the port 44b so that the piston rods 25b and 25c of the third air-cylinder 25 are caused to project forwardly until the third rollers 21 and 21' assume a projected position F' in phantom lines from a retracted position F in full line as shown in FIG. 1. The third rollers 21 and 21' are thus caused to be brought into contact with the shoulder portions 50 and 50' of the tread T. When the third rollers 21 and 21' are brought into contact with the shoulder portions 50 and 50' of the tread T, the projecting speed of the piston rod 25b of the third air-cylinder 25 is controlled by the shock absorber 30. As shown in FIG. 5, the third rollers 21 and 21' which are moved from the retracted initial position F to the position F'' in which they are just in contact with the surface of the tread T are thereafter moved to the final projected position F' decreasing the projecting speed of the piston rod 25b. Namely, the piston rod 25b of the third air-cylinder 25 is projected forwardly at a predetermined speed until the plate member 28 is engaged with the spring stop head 30b. When the plate member 28 is brought into contact with the spring stop head 30b, the third rollers 21 and 21' are just in contact with the surface of the tread T, assuming the position F''. The plate member 28 which is held in contact with the spring stop head 30b thereafter urges the control rod 30a toward the building drum 4, during which resistance is given to movement of the piston of the third air-cylinder 25 by the effect of an orifice provided in the shock absorber 30 to make the projecting speed of the piston rob 25b of the third air-cylinder 25 slower than that of the previously described predetermined speed. The piston rod 25b of the third air-cylinder 25 is thus projected forwardly and moved to the final projected position F from the intermediately projected position F'' of the third rollers 21 and 21' at a relatively slower speed to stitch the both shoulder portions 50 and 50' of the tread T even if the compressed air at a constant pressure is introduced into the port 44a. The slower movement of the third rollers 21 and 21' from the intermediately projected position F'' ensures uniform urging or stitching force to be exerted perpendicularly on all the points of the shoulder portions 50 and 50' as shown in FIG. 6 in cooperation with their constitutions of pneumatic tire rollers, with the result that entrapped air between the tread T and the carcasses C is completely evacuated therefrom to prevent the stretch and the waves which are generated during stitching by the conventional metal rollers. Even if the tread T in the form of a strip is applied on the toroidally shaped carcasses C, the stitching therefor are preferably performed without any deformation on the tread T, whereas in conventional apparatuses and methods, such deformation was appeared on the tread T since the outside portions 52 and 52' of the tread T axially outwardly of the shoulder portions 50 and 50' are rapidly squeezed, generating on its periphery many small waves which are in turn combined into a relatively large waves or deformation. The previous drawbacks are entirely eliminated by decreasing the projecting speed of the third rollers 21 and 21' in the previously mentioned manner and by making each of the third rollers 21 and 21' in a pneumatic tire roller.

When the stitching operations are concurrently carried out on the intermediate portions 51 and 51' and the shoulder portions 50 and 50' of the tread T by means of the second rollers 13 and 13' and the third rollers 21 and 21', respectively, for a predetermined time, the change-over valve in the air-junction 45 is changed to introduce the compressed air into the port 45b from the air-junction 45 and to discharge it into the air-junction 45 from the port 45a so that the piston rod 19a of the second air-cylinder 19 is retracted to move the second rollers 13 and 13' from the projected position E' to the initial position E. While the stitching operation is being carried out on the shoulder portions 50 and 50' of the tread T by the third rollers 21 and 21', the fourth rollers 32 and 32' commence to be projected toward the building drum 4. After a predetermined time passes from the time when the third air-cylinder 25 is actuated to forwardly project the third rollers 21 and 21', the compressed air is introduced into the port 46a from the air-junction 46 and discharged into the air-junction 46 from the port 46b so that the piston rods 36a and 36b of the fourth air-cylinder 36 are caused to project forwardly until the fourth rollers 32 and 32' assume a projected position H' in phantom lines from a retracted position H in full line as shown in FIG. 1. The fourth rollers 32 and 32' are thus caused to be brought into contact with the outside portions 52 and 52' of the tread T, during which the third rollers 21 and 21' are held in contact with the shoulder portions 50 and 50'. The projecting speed of the piston rod 36a of the fourth air-cylinder 36 is controlled in a similar manner to that of the piston rod 25b of the third air-cylinder 25 by means of the shock absorber 40, with the result that the stitching for the outside portions 52 and 52' of the tread T are preferably performed without any deformation as in the shoulder portions 50 and 50'. When the stitching operations for the shoulder portions 50 and 50' and the outside portions 52 and 52' of the tread are concurrently carried by means of the third rollers 21 and 21' and the fourth rollers 32 and 31', respectively, for a predetermined time, the change-over valve in the air-junction 44 is changed to introduce the compressed air into the port 44b from the air-junction 44 and to discharge it into the air-junction 44 from the port 44a so that the piston rod 25b of the third air-cylinder 25 is retracted to move the third rollers 21 and 21' from the projected position F' to the initial retracted position F. When the stitching operation for the outside portions 52 and 52' of the tread T is carried out by means of the fourth rollers 32 and 32' for a predetermined time, the change-over valve in the air-junction 46 is changed to introduce the compressed air into the port 46b and to discharge it into the air-junction 46 from the port 46a so that the piston rod 36a of the fourth air-cylinder 36 is retracted to move the fourth rollers 32 and 32' from the projected position H' to the retracted initial position H.

The stitching operations by the first, second, third, fourth rollers 5, 13, 13', 21, 21', 32 and 32' have thus been finished and produced a green tire which is thereafter removed from the building drum 4 for the succeeding stitching operation.

A single and complete cycle of the stitching operation in the apparatus of the present invention has been described. A number of such cycles will be repeated to produce green tires. The stitching apparatus of the present invention may be automatically operated if rotation of the building drum 4 and actuations of the air-cylinders 10, 19, 25 and 36 are controlled in accordance with a predetermined program.

While it has been described that the first, second, third and fourth rollers 5, 13, 13', 21, 21', 32 and 32' are provided, the second rollers 13 and 13' and either the third rollers 21 and 21' or the fourth rollers 32 and 32' may be removed. The support members 3 and 3' of the frame structure 1 may be constituted movably along the rotational axis of the building drum 4 for facilitating the stitching operations. While it has also been described that the tread T and the carcasses C are stitched with each other, the stitching apparatus embodying the present invention may be employed for stitching all the tire components.

The control of stitching for the shoulder portions 50 and 50' of the tread T by the third rollers 21 and 21' may be performed by another controlling arrangement or shock absorbing assembly which will now be described hereinafter.

In FIG. 7, a control cam 54 is securely mounted on one end of a movable rod 53 which is in parallel with the piston rods 25b and 25c of the third air-cylinder 25 and which has the other end securely connected to the plate member 28 fixed to the rear end of the piston rod 25c. A pressure-reducing valve 55 is supported by the support members 3 and 3' of the frame structure 1 in opposing relation with the control cam 54 and has a vertically movable actuation rod 56 projectable out of the upper end thereof for varying pressure of the compressed air discharged therefrom. A cam following roller 58 is rotatably mounted on the upper end of the movable actuation rod 56. The port 55a of the pressure-reducing valve 55 is connected to the port 44a of the third air-cylinder 25 through an air-hose 59, while the port 55b of the pressure-reducing valve 55 is connected through an air-hose 60 to the port 44b of the air-cylinder 25 which is in turn connected to the air-junction 44 through an air-hose (not shown). The control cam 54 has a profile 54a which is moved while being in contact with the roller 58 to urge the rod 54 upwardly or downwardly so that compressed air is introduced from the port 55a of the pressure-reducing valve 55 into the port 44a of the third air-cylinder 25, while having different pressure levels along movement of the piston rods 25b and 25c. The function of the control cam 54 and the pressure-reducing valve 55 ensures optimum stitching pressures to be exerted on the shoulder portions 50 and 50' of the tread T, resulting in the most excellent stitching condition. As the control cam 54 is detachably fixed to the plate member 28, it is possible that different stitching pressures are exerted on the shoulder portions 50 and 50' of the tread T by replacing various control cams 54 having different profiles. The advantages of the stitching control by the control cam 54 and the pressure-reducing valve 55 are entirely identical to those of the shock absorber 30. The previous controlling arrangement or shock absorbing assembly may be also replaced by the shock absorber 40, the control rod 40a and the plate member 38.

Although particular embodiments of the present invention have been shown and described, it will be obvious to those skilled in the art that various changes and modifications may be made without departing from the spirit and scope of the present invention.

What is claimed is:

1. A stitching apparatus for stitching tire components formed in a toroidal shape and laid out on a building drum, the apparatus comprising: a frame structure arranged opposingly to and spaced apart from the drum; a central roller disposed opposingly to a mid-circumferential plane of the drum and having a rotational aixs parallel with that of the drum for stitching mid-circumferrential portions of the tire components on the drum, said central roller being made of metal in a generally cyclindrical shape; at least one pair of side rollers circumferentially spaced apart from said central roller and arranged symmetrically to the mid-circumferential plane of the drum for stitching side portions of the tire components, said side roller having a rotational axis inclined to that of the drum, to urge perpendicularly against the tire components, and being constituted of a pneumatic tire roller; a roller urging mechanism including two urging means mounted on said frame structure in radical relation with the rotational axis of the drum and having respective leading ends rotatably carrying thereon said central roller and said side rollers for alternatively projecting and retracting said rollers toward and away from a circumferential surface of the drum to stitch the tire components from their mid-circumferential portions to their side portions; and a roller urging pressure control mechanism for controlling the urging pressures of said side rollers exerted onto the side portions of the tire components on the drum in cooperation with said roller urging mechanism upon movement of said side rollers toward the building drum.

2. A stitching apparatus for stitching tire components formed in a toroidal shape and laid out on a building drum, the apparatus comprising: a frame structure arranged opposingly to and spaced apart from the drum; a central roller group including a first roller disposed opposingly to a mid-circumferential plane of the drum and having a rotational axis parallel with that of the drum and made of metal in a generally cylindrical shape, and a pair of second rollers circumferentially spaced apart from said first roller and disposed axially outwardly of said first roller in symmetrical relation with the mid-circumferential plane of the drum, said second rollers being made of metal in the form of a generally truncated cone having small-diameter faces opposing each other; a side roller group including a pair of third rollers circumferentially spaced apart from said first and said second rollers and disposed axially outwardly of said second rollers in symmetrical relation with the mid-circumferential plane of the drum, and a pair of fourth rollers circumferentially spaced apart from said first, said second, and said third rollers, and disposed axially outwardly of said third rollers in symmetrical relation with the mid-circumferential plane of the drum, said third and said fourth rollers having a rotational axis inclined to that of the drum to urge perendicularly against the tire components, and being constituted of pneumatic tire rollers; a roller urging mechanism including first, second, third and fourth fluid-operated cylinders circumferentially spaced apart from each other and mounted on said frame structure in radical relation with the rotatinal axis of the drum and having respective leading ends rotatably carrying thereon said first, said second, said third and said fourth rollers for alternatively projecting and retracting said rollers toward and away from a circumferential surface of the drum to stitch the tire components from their mid-circumferential portions to their outside portions through their intermediate portions axially outwardly of the mid-circumferential portions and axially inwardly of the outside portions, and their shoulder portions between the intermediate portions and the outside portions; and a roller urging pressure control mechanism including a first shock absorbing assembly positioned rearwardly of said third cylinder for reducing the projecting speed of a piston rod of said third cylinder, and a second shock absorbing assembly positioned rearwardly of said fourth cylinder for reducing the projecting speed of a piston rod of said fourth cylinder, so as to respectively control the urging pressures of said third and said fourth rollers exerted onto the shoulder portions and the outside portions of the tire components on the building drum.

3. The stitching apparatus as defined in claim 2, wherein said first shock absorbing assembly includes a first shock absorber mounted on the rear end portion of said third cylinder, a first additional piston rod coaxially connected to said piston rod of the third cylinder, a plate member securely mounted on the rear end of said first additional piston rod, and a first control rod slidably received in said first shock absorber and resiliently projecting toward said first plate member in parallel relation with said first additional piston rod; and said second shock absorbing assembly includes a second shock absorber mounted on a rear end portion of said fourth cylinder, a second additional piston rod coaxially connected to said piston rod of the fourth cylinder, a second plate member securely mounted on the rear end of said second additional piston rod, and a second control rod slidably received in said second shock absorber and resiliently projecting toward said second plate member in parallel relation with said second additional piston rod.

4. The stitching apparatus as defined in claim 2, wherein said first shock absorbing assembly includes a first additional piston rod coaxialy connected to said piston rod of the third cylinder, a first control cam connected to said first additional piston rod and having a first profile, and a first pressure-reducing valve positioned opposingly to said first profile and fluidly connected to a pair of ports of said third cylinder through a pair of first hoses, said first valve having a first actuation rod movable toward and away from said first profile and a first roller rotatably mounted on a leading end of said first rod in contacting relation with said first profile; and said second shock absorbing assembly includes a second additional piston rod coaxially connected to said piston rod of the fourth cylinder, a second control cam connected to said second additional piston rod and having a second profile, and a second pressure-reducing valve positioned opposingly to said second profile and fluidly connected to a pair of ports of said fourth cylinder through a pair of second hoses, said second valve having a second actuation rod movable toward and away from said second profile and a second roller rotatably mounted on a leading end of said second rod in contacting relation with said second profile; whereby said piston rods of the third and the fourth cylinders are controlled to move toward and away from the building drum upon movement of said first and said second profiles by said first and said second valves.

5. The stitching apparatus as defined in claim 2, wherein said frame structure includes a base member and a pair of parallel spaced support members vertically mounted on said base member in opposing relation with the mid-circumferential portions of the building drum, and wherein said fluid-operated cylinders are disposed between and securely supported on said support members in radial relation with the rotational axis of the drum, and having respective piston rods projectable and retractable toward and away from the circumferential surface of the drum, a piston rod and said first cylinder securely supporting at its leading end a first bracket rotatably carrying thereon said first roller of the central roller group, a piston rod of said second cylinder securely supporting at its leading end a second bracket rotatably carrying thereon said second rollers of the central roller group, said piston rod of the third cylinder securely supporting at its leading end a third bracket rotatably carrying thereon said third rollers of the side roller group, and said piston rod of the fourth cylinder securely supporting at its leading end a fourth bracket rotatably carrying thereon said fourth rollers of the side roller group.

6. The stitching apparatus defined in claim 5, wherein said first bracket includes a first bracket support securely mounted on said leading end of the piston rod on said first cylinder, a first slide base slidably received of said first bracket support, and a pair of first parallel spaced support arms perpendicularly attached to said first slide base for rotabaly supporting said first roller of the central roller group with its rotational axis parallel to that of the drum; said second bracket includes a second bracket support securely mounted on said leading end of the piston rod of said second cylinder, a pair a second slide bases slidably received on said second bracket support, and two pairs of second parallel spaced support arms each pair of which is perpendicularly attached to respective ones of said second slide bases for rotatably supporting said second rollers of the central roller group with their rotational axes parallel to that of the drum; said third bracket includes a third bracket support securely mounted on said leading end of the piston rod of the third cylinder, and a pair of third parallel spaced support arms perpendicularly slidably attached to said third bracket support for rotatably supporting said third rollers of the side roller group with their rotational axes inclined to that of the drum to urge said third rollers perpendicularly against the tire components on the drum; and said fourth bracket includes a fourth bracket support securely mounted on said leading end of the piston rod of the fourth cylinder, and a pair of fourth parallel spaced support arms perpendiculrly slidably attached to said fourth bracket support for rotatably supporting said fourth rollers of the side roller group with their rotational axes inclined to that of the building drum to urge said fourth rollers perpendicularly against the tire components on the drum.

7. The stitching apparatus as defined in claim 5, wherein each of said cylinders is an air-cylinder.

* * * * *